O. SCHULZE.
MEASURING INSTRUMENT HAVING AN ELECTROMAGNETIC BRAKE.
APPLICATION FILED JULY 29, 1908.

937,099.

Patented Oct. 19, 1909.

WITNESSES:
Fred White
René Bruine

INVENTOR:
Otto Schulze,
By Attorneys;

UNITED STATES PATENT OFFICE.

OTTO SCHULZE, OF STRASSBURG, GERMANY.

MEASURING INSTRUMENT HAVING AN ELECTROMAGNETIC BRAKE.

937,099.  Specification of Letters Patent.  Patented Oct. 19, 1909.

Application filed July 29, 1908. Serial No. 446,027.

*To all whom it may concern:*

Be it known that I, OTTO SCHULZE, a subject of the German Emperor, residing in Strassburg, Germany, have invented certain new and useful Improvements Relating to Measuring Instruments Having an Electromagnetic Brake, of which the following is a specification.

All measuring instruments based on the use of electromagnets, as well as those comprising electric motors, are affected by variations of temperature and yield readings which are too high or too low accordingly as the surrounding temperature is below or above the normal. The readings are particularly fallacious owing to this cause in measuring apparatus wherein there is a braking effect due to eddy currents developed in a metal disk moving in a magnetic field, as is the case for example in electricity meters, tachometers, or electromagnetic speed indicators.

It is known that the electrical resistance both of the disk brakes and of the metal used for the windings of the inductor and the armature in such apparatus, increases with the temperature in a ratio that has been determined. Rise of temperature also enfeebles the magnetism of the permanent magnets or electromagnets. Briefly, the variations of temperature produce a modification of more or less importance in the degree of resistance or in the magnetization of the elements entering into the construction of these instruments, which sensibly influences the exactness of their registrations. All these phenomena interfere considerably with the exactness of the readings given by these instruments, and it is for this reason that the instruments have always been difficult to standardize in practice. It may be noted that the electrical resistance of copper and that of aluminium, metals which are generally used in the construction of these apparatus, have both a temperature coefficient of 0.38 per cent. per degree centigrade. There exist, indeed, alloys which have only a very feeble temperature coefficient, but on the other hand they have the great disadvantage that they have too high a specific resistance, so that they are quite inappropriate for the construction of such apparatus. Even the use of these alloys only obviates the aforesaid inconvenience to a minor extent.
For the purpose of completely suppressing all these perturbing causes, the present invention relates to a compensating mechanism for such instruments which operates by modifying the intensity of the magnetic field of the electromagnetic system constituting the brake by utilizing the variations of temperature for varying the dimensions of the air-gap, the intensity of the magnetic field being a function of the distance between the magnetic parts constituting the electromagnetic brake.

In the accompanying drawings Figures 1-4 are diagrammatic vertical sections through several forms of apparatus embodying the invention.

Fig. 1 is an electromagnetic speed indicator in which the disk $a$ which closes the magnetic circuit is adapted to be displaced relatively to the magnetic poles $b$. It is subject to the action of springs $c$ guided by stems $d$ that traverse the cover $e$ of the casing $f$. In the cover are inserted hollow metal cylinders $g$ closed at one end and provided at the end facing the disk $a$ with a membrane $h$ impermeable to air against which the movable iron disk $a$ is pressed under action of the springs $c$. The cylinders are filled according to the force which it is required to use, with air or some other gas, or with a liquid, or with any other substance having a high coefficient of dilatation and which owing to rise and fall of temperature inflates or deflates the membranes $h$ and thus moves the disk $a$ toward or away from the magnetic poles $b$, producing in this manner a variation in the intensity of the magnetic field. The strengthening or enfeebling of the intensity of the magnetic field has the effect of modifying the braking couple which acts on the metal disk $i$ rotating in this field. These variations of the braking couple are proportional to the perturbing effects produced in the magnetic field by the variations of temperature and produce the desired compensation.

Fig. 2 shows a modification in which the metallic braking piece $i$ has the form of a cylinder; the magnetic circuit of the iron horse-shoe magnet $b'$ is closed by two iron or steel blades $a'$ united by a spring $c'$ which is capable of being stretched. These blades $a'$, in consequence of the dilatation or the contraction of the fluid contained in the cylinder or cylinders $g$ situated between them, have their position relative to the magnetic poles *b'* varied and produce the same compensating effect as that explained with reference to Fig. 1.

Figure 1:
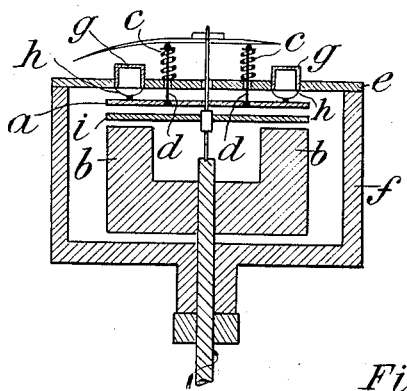
Figure 2:
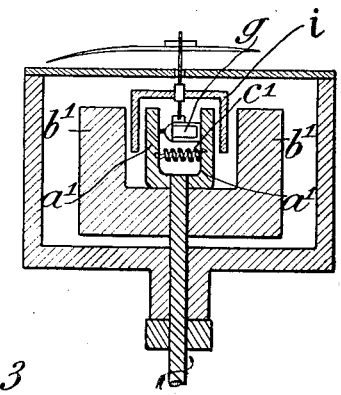
Figure 3:
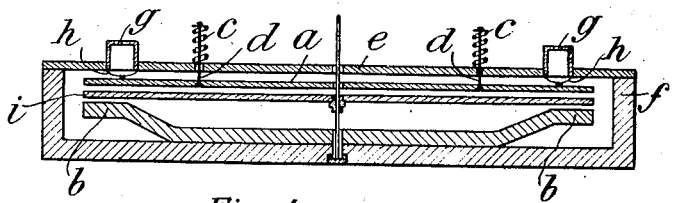
Fig. 3 shows a Foucault brake in an electricity meter in which the compensation is secured in the same manner as that described with reference to Fig. 1.
Figure 4:
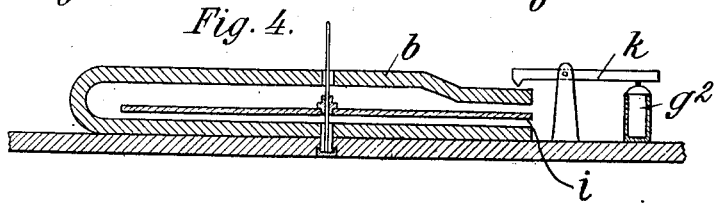
Fig. 4 shows another arrangement of Foucault brake in an electricity meter in which the brake disk *i* oscillates in the magnetic field in the neighborhood of the poles. In this arrangement, the variation of the intensity of the magnetic field is also produced by means of cylinders $g^2$, but through the intermediation of a lever *k*.

Though I have described with great particularity of detail certain specific embodiments of the invention, yet it is not to be understood that the invention is restricted to the particular embodiments described. Various modifications thereof in detail and in the arrangement of the parts may be made by those skilled in the art without departing from the invention.

What I claim is:—

An electro-magnetic measuring instrument having means for producing a magnetic field in an air space, a metal disk rotating through said magnetic field, and means for compensating for changes of temperature by changing the size of the air space through which said disk rotates, said compensating means comprising a hollow body, filled with a fluid which is highly expansible by heat, and a diaphragm closing said hollow body and yielding to the expansion of the fluid.

In witness whereof, I have hereunto signed my name in the presence of two subscribing witnesses.

OTTO SCHULZE.

Witnesses:
 CARL W. SCHMITT,
 MARIA HÄTTIG.